(12) United States Patent
Tucker

(10) Patent No.: US 6,684,812 B1
(45) Date of Patent: Feb. 3, 2004

(54) ANIMAL FEEDER SUPPORT DEVICE

(76) Inventor: Eugene Tucker, 5050 S. 108th, Noble, OK (US) 73068

( * ) Notice: Subject to any disclaimer, the term of this patent is extended or adjusted under 35 U.S.C. 154(b) by 0 days.

(21) Appl. No.: 10/373,284

(22) Filed: Feb. 24, 2003

Related U.S. Application Data
(60) Provisional application No. 60/360,294, filed on Feb. 27, 2002.

(51) Int. Cl.[7] ............ A01K 1/00; A01K 39/00; A01K 5/00
(52) U.S. Cl. .............. 119/57.91; 119/51.01; 182/116
(58) Field of Search ............ 119/51.01, 57.91, 119/51.11, 52.2, 57.8; 182/116, 187

(56) References Cited

U.S. PATENT DOCUMENTS

| | | | | |
|---|---|---|---|---|
| 1,359,691 A | * | 11/1920 | Genuit | 119/70 |
| 2,636,474 A | * | 4/1953 | Parker | 119/51.01 |
| 4,125,302 A | * | 11/1978 | Peritz et al. | 248/328 |
| 4,427,092 A | | 1/1984 | Tentler | 182/134 |
| 4,428,459 A | | 1/1984 | Peck | 182/182 |
| 4,708,221 A | | 11/1987 | Kubiak | 182/187 |
| 4,782,918 A | | 11/1988 | Brunner et al. | 182/187 |
| 4,787,476 A | | 11/1988 | Lee | 182/116 |
| 4,936,416 A | | 6/1990 | Garon | 182/187 |
| 4,945,859 A | | 8/1990 | Churchwell | 119/57.91 |
| 5,064,020 A | | 11/1991 | Eagleson | 182/20 |
| 5,143,022 A | | 9/1992 | Fore | 119/51.03 |
| 5,143,177 A | | 9/1992 | Smith | 182/187 |
| 5,199,527 A | | 4/1993 | Jennings | 182/187 |
| 5,201,279 A | | 4/1993 | Impastato et al. | 119/51.03 |
| D353,535 S | | 12/1994 | Grittman et al. | |
| 5,409,083 A | | 4/1995 | Thompson et al. | 182/187 |
| 5,572,949 A | * | 11/1996 | Bryant et al. | 119/57.91 |
| 5,842,541 A | * | 12/1998 | Arcuri | 182/187 |
| 5,862,777 A | | 1/1999 | Sweeney | 119/57.91 |
| 6,021,987 A | | 2/2000 | Shimota | 248/311.2 |
| 6,305,320 B1 | * | 10/2001 | Fore | 119/51.01 |
| 6,564,746 B2 | * | 5/2003 | Burnham | 119/57.91 |
| D477,440 S | * | 7/2003 | Ansaldo | D30/121 |
| 2001/0023794 A1 | * | 9/2001 | Andrey | 182/116 |

\* cited by examiner

*Primary Examiner*—Charles T. Jordan
*Assistant Examiner*—Judith A. Nelson
(74) *Attorney, Agent, or Firm*—Dunlap Codding & Rogers

(57) ABSTRACT

An animal feeder support device for maintaining a feed container on a substantially vertically extending support member a distance above the ground. The animal feeder support device comprises a stabilizing member, a container support frame, an arm, a first cable, a second cable, and an adjustable strap assembly. The stabilizing member is disposable in a substantially vertical position on the substantially vertically extending support member. The container support frame has an opening sized to receive a feed dispenser of the feed container when the feed container is positioned on the container support frame. The arm has a medial portion connected to the stabilizing member. The first and second cables are adjustably connected to the container support frame. The adjustable strap assembly is connectable to the arm near the medial portion of the arm so that the strap assembly is extendable about the vertically extending support member.

10 Claims, 5 Drawing Sheets

ANIMAL FEEDER SUPPORT DEVICE

CROSS-REFERENCE TO RELATED APPLICATION

This application claims the benefit of U.S. Provisional application U.S. Serial No. 60/360,294, filed Feb. 27, 2002, the contents of which are hereby expressly incorporated herein by reference.

BACKGROUND OF THE INVENTION

1. Field of the Invention

The present invention relates generally to an animal feeder support device and more particularly, but not by way of limitation, to a portable animal feeder support device capable of supporting varying sizes of containers and which readily integrates into the woodland setting and surroundings.

2. Brief Description of Related Art

For years, wildlife enthusiasts have fed supplemental grains and minerals to wildlife. Many devices have been used for this purpose. The current trend is to employ containers that hold from as little as five gallons to as much as one thousand bushels of grain or supplement.

By far, the most popular container used for feeding supplemental grains and minerals is the fifty-five gallon drum because such drums are inexpensive and readily available. Most wildlife enthusiasts and hunters attach a mechanism to the drum that dispenses a measured amount of grain or supplement at predetermined times throughout the day or night. The drums are attached to many different types of devices in order to elevate the drums above ground level, usually from three to ten feet, for supplemental feeding of wildlife.

The most common device for supporting a container above ground level for supplemental feeding of wildlife is a tripod system which has three legs, or a quadpod system which has four legs. The legs of the tripod system and the quadpod system are generally attached to the container by bolts, sockets or by welding the legs directly to the container. While both the tripod system and the quadpod system have met with some success, problems have nevertheless been encountered when using such devices for supporting the container above ground level in that such devices are susceptible to being blown down by high winds and tipped or tilted by wild game or domestic animals.

Rope and pulley systems are probably the second most common device for supporting a container above ground level for supplemental feeding of wildlife. The advantage of a rope and pulley system is that such a system is readily portable. However, when employing a rope and pulley system for supporting the container, the user is required to set up a support frame or locate a suitable tree with precisely proportioned limbs so that the pulley can be attached to the limb. To secure the pulley to a tree, the user must climb the tree, hang one or more pulleys, fill the container with grain or supplement and then raise the filled container to the desired level above the ground. Because of the many risks involved in securing one or more pulleys to the limb of the tree, potential injury to the user is evident.

Therefore, a need exists for an improved animal feeder support device which is not subject to being blown down by high winds, tipped or tilted by wild game or domestic animals, or which does not endanger the user during attachment of the animal feeder support device or during replenishing of grain or mineral supplement in a container support thereon. Further, it is desirable that the animal feeder support device be portable so that it can be readily moved from one location to another and can be carried into deeply wooded areas without difficulty. Finally, it is desirable that the animal feeder support device have a natural look which easily integrates into the woodland setting and surroundings and reduces the need to repeatedly disturb the natural habitat of wildlife, while monitoring or maintaining supplemental feeding of grains and minerals to wildlife. It is to such an animal feeder support device that the present invention is directed.

DETAILED DESCRIPTION OF THE INVENTION

Figure 1:
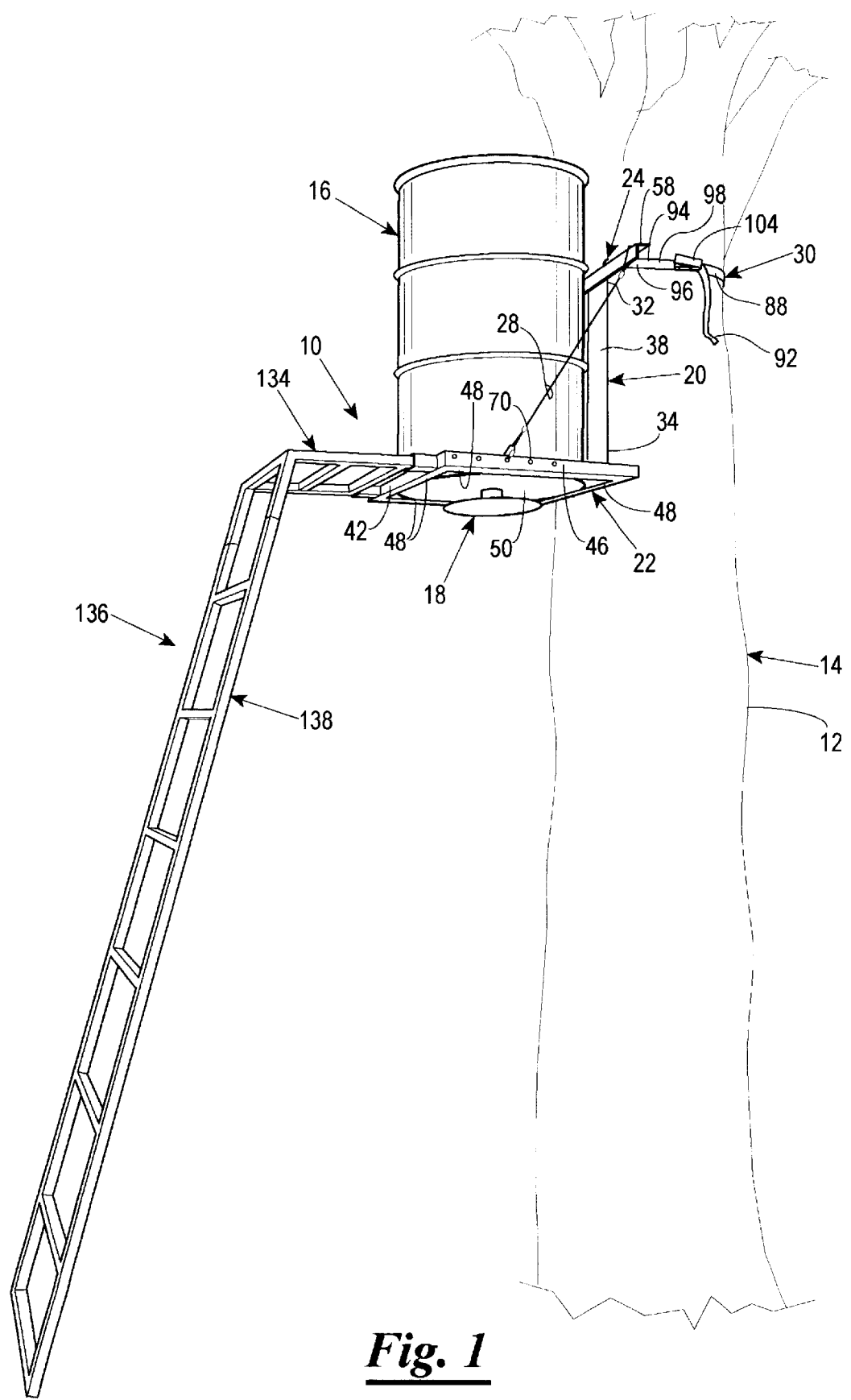
FIG. 1 is a perspective view of an animal feeder support device constructed in accordance with the present invention, the animal feeder support device being secured to a trunk of a tree and having a detachable ladder assembly attached thereto for positioning a container on the animal feeder support device a distance above ground level.

Referring now to the drawings, and more particularly to FIG. 1, shown therein is an animal feeder support device 10 constructed in accordance with the present invention. The animal feeder support device 10 is secured to a vertically extending support member, such as a trunk 12 of a tree 14. A feed container 16, having a feed dispenser 18, is supported on the animal feeder support device 10 so that the feed container 16, and thus the feed dispenser 18 are maintained a predetermined distance above ground level for permitting discharge of feed and supplement from the feed container 16 via the feed dispenser 18.

While the trunk 12 of the tree 14 has been shown as the vertically extending support member, it should be understood that the vertically extending support member can be any structure that is substantially vertically disposed and extends a distance above the ground so that the animal feeder support device 10 can be connected thereto in a manner hereinafter described.

Similarly, while the feed container 16 has been shown as a barrel, it should be understood that the feed container 16 can be of any size and configuration so long as the feed container 16 can be supportingly disposed on the animal feeder support device 10.

Referring now to FIGS. 1–4, the animal feeder support device 10 includes a stabilizing member 20, a container support frame 22, an arm 24, a first cable 26, a second cable 28, and an adjustable strap assembly 30.

The stabilizing member 20 is disposed adjacent the trunk 12 of the tree 14, preferably in a substantial vertical position. The stabilizing member 20 has an upper end 32 and a lower end 34. The stabilizing member 20 is desirably V- or L-shaped along its length. Thus, the stabilizing member 20 is provided with a first leg 36 and a second leg 38. While the stabilizing member 20 is desirably V- or L-shaped, the legs 36 and 38 of the stabilizing member 20 may be configured in any manner that permits the stabilizing member 20 to be disposed against the trunk 12 of the tree 14 so that the legs 36 and 38 of the stabilizing member 20 engage a portion of the trunk 12 of the tree 14 and thereby stabilize the animal feeder support device 10 when the animal feeder support device 10 is positioned against the trunk 12 of the tree 14 and secured thereto via the adjustable strap assembly 30. The stabilizing member 20 can be made of any material having sufficient strength to support the container 16 on the container support frame 22 when the container 16 is filled with grain or supplement.

The container support frame 22 has a proximal side 40, a distal side 42, a first side 44, a second side 46, and an inwardly disposed ledge 48 which extends from each of the proximal side 40, the distal side 42, the first side 44, and the second side 46 of the container support frame 22 while providing support for a lower end 50 of the container 16 so that the container 16 can be maintained in a stable upright position on the container support frame 22 substantially shown in FIG. 1. Further, the ledge 48 defines an opening 52 (FIGS. 2 and 3) in the container support frame 22 through which the feed dispenser 18 is disposed so that grain or supplement can be dispersed from the container 16 supported on the container support frame 22 without interference from the container support frame 22.

Figure 2:
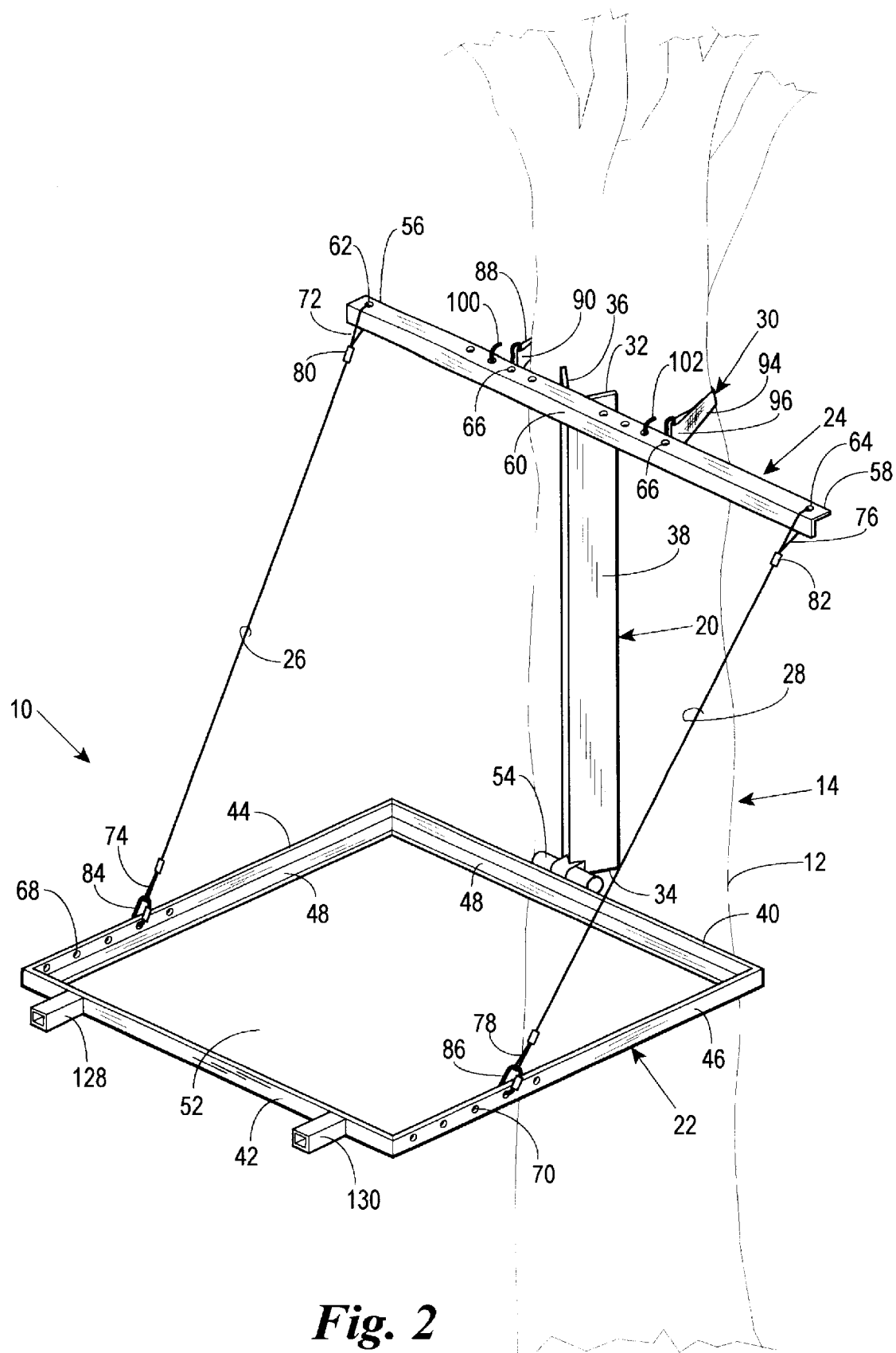
FIG. 2 is a perspective view of the animal feeder support device of the present invention secured to the trunk of a tree, a container support frame of the animal feeder support device being disposed in a substantially horizontal position a distance above ground level.
Figure 3:
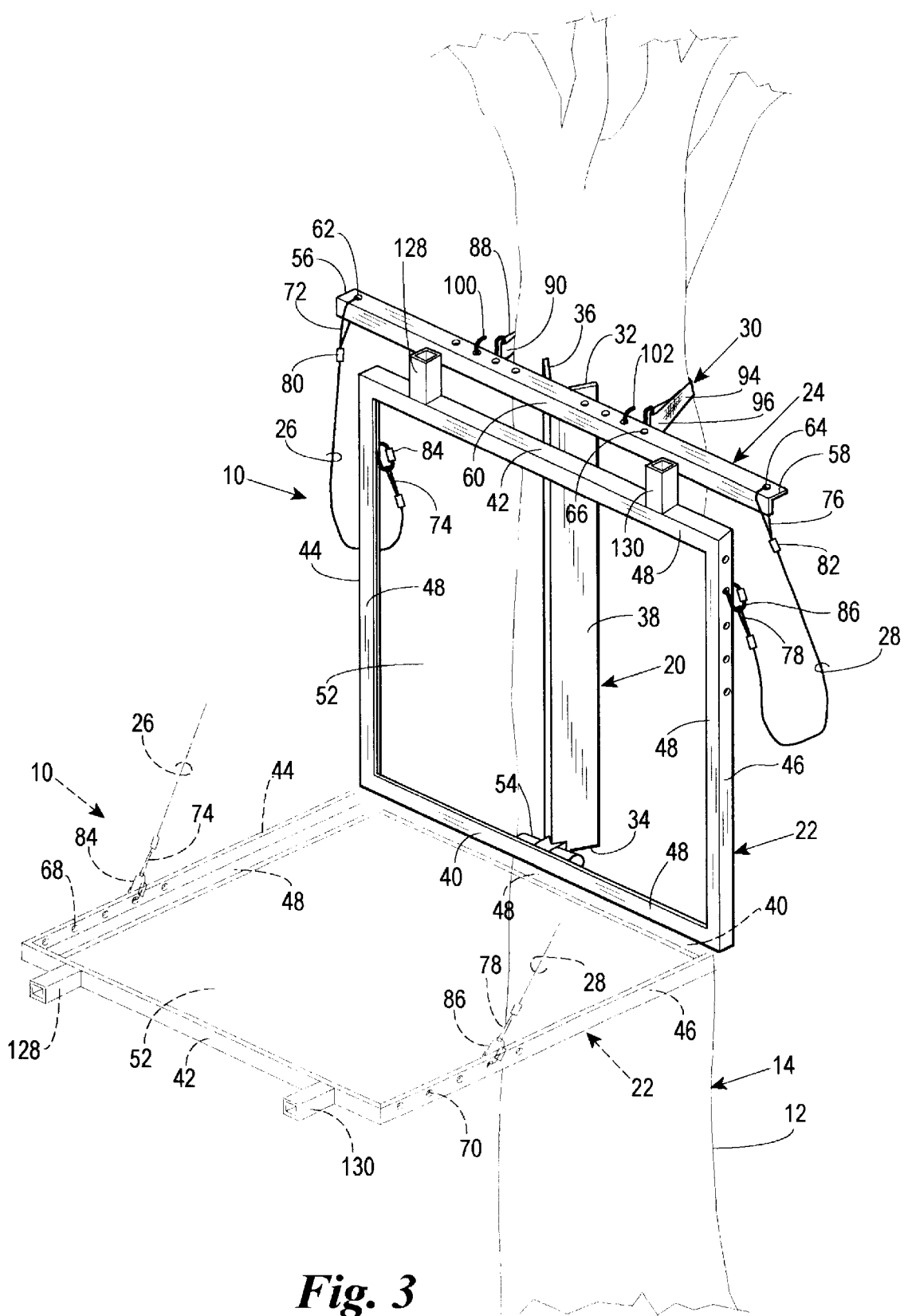
FIG. 3 is a perspective view of the animal feeder support device of the present invention secured to the trunk of a tree wherein the animal feeder support device is in a folded position for storage.
Figure 4:
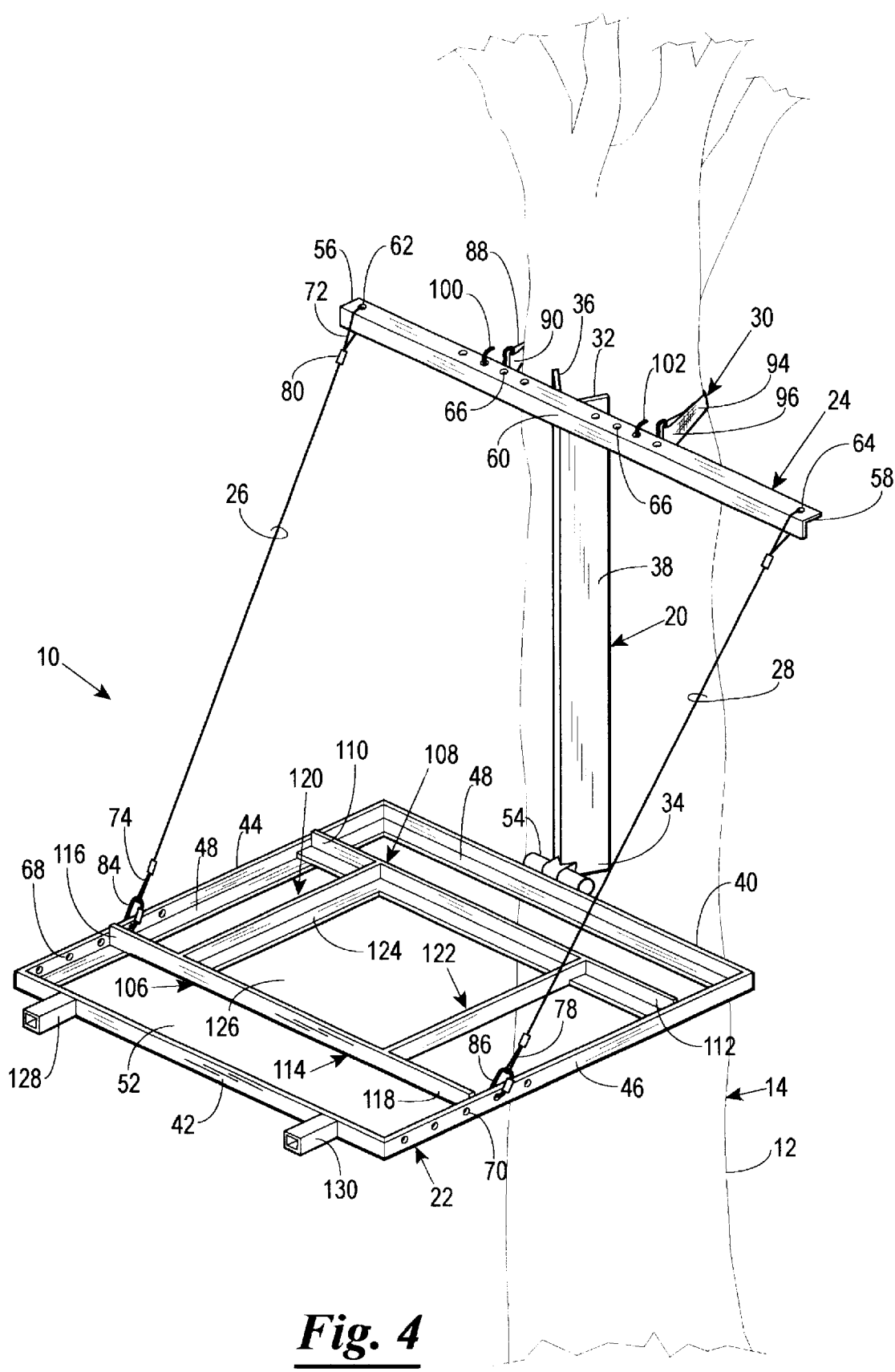
FIG. 4 is a perspective view of the animal feeder support device with a frame insert disposed in the container support frame.
Figure 5:
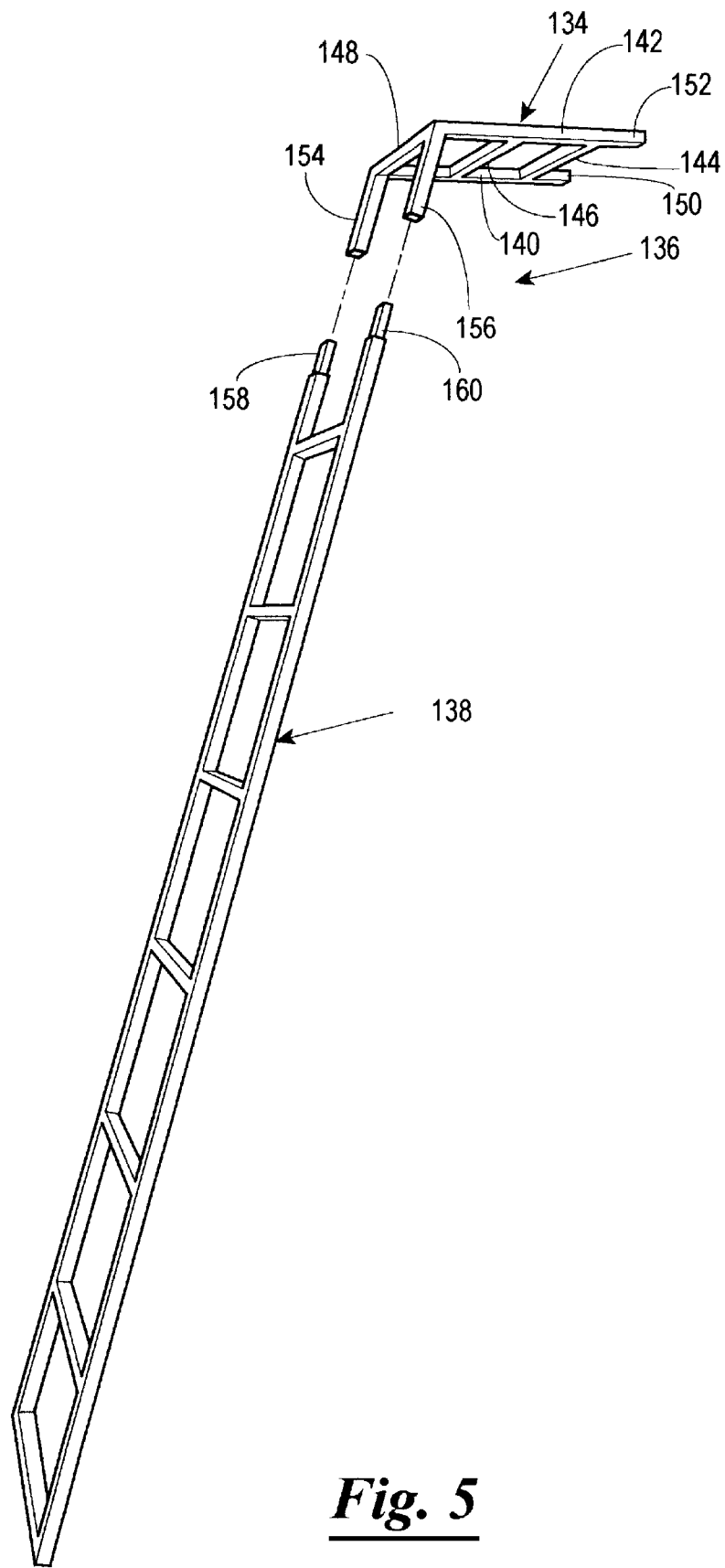
FIG. 5 is a perspective view of a disconnected header and ladder of the ladder assembly of the animal feeder support device.

The proximal side 40 of the container support frame 22 is pivotally connected to the stabilizing member 20 near the lower end 34 of the stabilizing member 20 via a hinge 54. The pivotal connection of the proximal side 40 of the container support frame 22 to the stabilizing member 20 permits the container support frame 22 to be disposed in a substantially horizontal first position as shown in FIGS. 1–3 and a folded second position for carrying and/or storage as shown in FIG. 4.

The pivotal connection of the proximal side 40 of the container support frame 22 to the stabilizing member 20 not only facilitates the disposition of the container support frame 22 in one of the first and second positions, but also cooperates with the first and second cables 26 and 28 to permit the pitch of the container support frame 22 to be adjusted so that the container support frame 22 is maintained in a substantially horizontal position regardless of the angle of the trunk 12 of the tree 14 to which the animal feeder support device 10 is affixed as will be described in detail hereinafter.

While the pivotal connection between the container support frame 22 and the stabilizing member 20 has been described as being achieved with the hinge 54, it should be understood that any other mechanism capable of pivotally connecting the proximal side 40 of the container support frame 22 to the stabilizing member 20 can be employed so long as the mechanism permits the container support frame 22 to be selectively moved to one of the first and second positions.

The arm 24 of the animal feeder support device 10 is connected to the container support frame 22 via the stabilizing member 20 and the first and second cables 26 and 28 such that the container support frame 22 is movable between the first and second positions. Further, the arm 24 cooperates with the adjustable strap assembly 30 to secure the stabilizing member 20 to the trunk 12 of the tree 14 at a desired height relative to the ground.

As more clearly shown in FIGS. 2–4, the arm 24 is provided with a first end 56, a second end 58 and a medial portion 60. The medial portion 60 of the arm 24 is connected to the stabilizing member 20 of the animal feeder support device 10 near the upper end 32 of the stabilizing member 20 such that an elongated axis of the arm 24 is disposed substantially perpendicular to an elongated axis of the stabilizing member 20 (see FIGS. 2–4).

The arm 24 is provided with an aperture 62 near the first end 56 thereof, an aperture 64 near the second end 58 thereof, and a plurality of apertures 66 disposed along the medial portion 60 of the arm 24 substantially as shown in FIGS. 2–4. The aperture 62 formed in the arm 24 near the first end 56 thereof cooperates with a plurality of apertures 68 provided in the first side 44 of the container support frame 22, and the aperture 64 provided in the arm 24 near the second end 58 thereof cooperates with a plurality of apertures 70 provided in the second side 46 of the container support frame 22 for permitting interconnection of same via the first and second cables 26 and 28. That is, the aperture 62 near the first end 56 of the arm 24 cooperates with the plurality of apertures 68 in the first side 44 of the container support frame 22 for permitting interconnection of same via the first cable 26, and the aperture 64 near the second end 58 of the arm 24 cooperates with the plurality of apertures 70 in the second side 46 of the container support frame 22 to permit interconnection of the container support frame 22 to the second end 58 of the arm 24 via the second cable 28. Further, the plurality of apertures 68 in the first side 44 of the container support frame 22 and the plurality of apertures 68 in the second side 46 of the container support frame 22 provide adjustable connection of the first and second cables 26 and 28 to the first and second sides 44 and 46 of the container support frame 22 so as to permit the pitch of the container support frame 22 to be adjusted and thereby maintain the container support frame 22 in a substantially horizontal position as shown in FIGS. 1, 2, and 4 of the drawings.

To provide the desired interconnection of the arm 24 to the container support frame 22, the first cable 26 is provided with a first end 72 and a second end 74, and the second cable 28 is likewise provided with a first end 76 and a second end 78. The first end 72 of the first cable 26 is threaded through the aperture 62 near the first end 56 of the arm 24 and secured thereto via a clamp 80. Similarly, the first end 76 of the second cable 28 is threaded through the aperture 64 near the second end 58 of the arm 24 and secured thereto with a clamp 82. Thus, the first ends 72 and 76 of the first and second cables 26 and 28 are securely connected to the first and second ends 56 and 58, respectively, of the arm 24.

To provide adjustable connection of the arm 24 to the container support frame 22 so that the pitch of the container support frame 22 can be varied, the second end 74 of the first cable 26 is provided with a hook or C-clamp 84 sized and configured to be disposed in one of the apertures of the plurality of apertures 68 provided in the first side 44 of the container support frame 22, and the second end 78 of the second cable 28 is provided with a hook or C-clamp 86 adapted to be disposed through one of the plurality of apertures 70 provided in the second side 46 of the container support frame 22. Thus, the pitch of the container support frame 22 can be varied relative to the stabilizing member 20 and the arm 24 depending upon the placement of the hooks or C-clamps 84 and 86 in selected apertures of the plurality of apertures 68 and 70 provided in the first and second sides 44 and 46 of the container support frame 22. It should also be understood that while the connection of the first ends 72 and 76 of the first and second cables 26 and 28, respectively, to the first and second ends 56 and 58 of the arm 24, via the clamps 80 and 82 have been depicted, and that the hooks or C-clamps 84 and 86 have been described for connecting the seconds ends 74 and 78 of the first and second cables 26 and 28 to the first and second sides 44 and 46, respectively, of the container support frame 22, any suitable connector can be employed that will permit the first ends 72 and 76 of the first and second cables 26 and 28 to be connected to the first and second ends 56 and 58 of the arm 24 and the second ends 74 and 78 of the first and second cables 26 and 28 to be connected to the first side 44 and the second side 46, respectively, of the container support frame 22 such that the pitch of the container support frame 22 can be readily adjusted while permitting the container support frame 22 to be selectively moved between one of the first position and the second position.

As shown in FIGS. 1–4, the adjustable strap assembly 30 of the animal feeder support device 10 is disposed about the trunk 12 of the tree 14 for securing the stabilizing member 20 in a secure position on the trunk 12 of the tree 14 and thereby maintains the animal feeder support device 10 in a secure stable position. The adjustable strap assembly 30 is provided with a first strap 88 having a first end 90 and a second end 92, and a second strap 94 having a first end 96 and a second end 98. The first end 90 of the first strap 88 is provided with a hook 100, and the first end 96 of the second strap 94 is provided with a hook 102. The hook 100 on the first end 90 of the first strap 88 is disposed in one of the plurality of apertures 66 formed in the medial portion 60 of the arm 24 so as to be disposed in close proximity to the first leg 36 of the stabilizing member 20. Similarly, the hook 102 on the first end 96 of the second strap 94 is disposed in one of the plurality of apertures 66 formed in the medial portion 60 of the arm 24 so as to be disposed in close proximity to the second leg 38 of the stabilizing member 20. The second end 98 of the second strap 94 is provided with a buckle 104 (FIG. 1) adapted to receive a portion of the first strap 88 so as to secure the second strap 94 to the first strap 88. The buckle 104 is a typical seatbelt-type buckle such that when the second end 92 of the first strap 88 is disposed therethrough, the first strap 88 can be pulled through the buckle 104 until the first and second straps 88 and 94 are tightened to secure the animal feeder support device, 10 to the trunk 12 of the tree 14. While the first and second straps 88 and 94, in combination with the hooks 100 and 102 and the buckle 104, have been depicted as the adjustable strap assembly 30, it should be understood that any strap assembly can be employed provided such strap assembly is capable of securing the animal feeder support device 10 in a stable position on the trunk 12 of the tree 14.

Referring now to FIG. 4, the animal feeder support device 10 is shown as further including a frame insert 106 for reducing the size of the opening 52 in the container support frame 22 so that a container having a diameter less than the diameter of the opening 52 in the container support frame 22 can be supported in a stable position on the animal feeder support device 10. The frame insert 106 is provided with a first leg 108 having a first end 110 and a second end 112, a substantially parallel, spatially disposed second leg 114, having a first end 116 and second end 118, and a plurality of spatially disposed cross braces 120 and 122 extending between the first and second legs 108 and 114 of the frame insert 106. The first leg 108 is provided with a length substantially corresponding to the width of the container support frame 22 between the first side 44 and the second side 46 thereof, and the second leg 114 of the frame insert 106 is likewise provided with a length corresponding to the distance between the first side 44 and the second side 46 of the container support frame 22 such that upon positioning the first ends 110 and 116 of the first and second leg members 108 and 114, respectively, of the frame insert 106 and the second ends 112 and 118 of the first and second leg members 108 and 114 of the frame insert 106 and support members on the ledge 48 disposed adjacent to the second side 46 of the container support frame 22, the frame insert 106 is secured in a stable position on the container support frame 22. The distance between the cross braces 120 and 122 of the frame insert 106, as well as the distance between the first and second legs 108 and 114, respectively, of the frame insert 106 will be determined by the dimensions of the container 16 to be supported thereon.

An inwardly disposed ledge 124 extends from each of the first leg 108, the second leg 114, and the cross braces 120 and 122 for supportingly receiving a lower end (not shown) of a feed container (also not shown) having a diameter less than the opening 52 in the container support frame 22. Further, the ledge 124 defines an opening 126 through which a feed dispenser (not shown) but similar to the feed dispenser 18 connected to the feed container 16, as shown in FIG. 1. Thus, the opening 126 in the frame insert 106 permits grain or feed supplement to be dispersed from the feed container via the feed dispenser without interference from the frame insert 106. It should be noted that the container and feed dispenser (not shown) supported on the frame insert 106 are similar in construction and function to the feed container 16 and feed dispenser 18 hereinbefore described with reference to FIG. 1 except the size of the feed container has a length and width substantially corresponding to the length and width of the opening 126 formed in the frame insert 106 via the first and second legs 108 and 114, respectively, and the spatially disposed cross braces 120 and 122. It should also be noted that the configuration of the container is not to be construed as a barrel having a circular perimeter, but any suitable configuration such as a cube, and the like, can be employed as long as it is sized to be supported on the ledge 124 of the frame insert 106.

To enable one to easily secure the animal feeder device 10 to the trunk 12 of the tree 14 a desired distance above the ground, and to permit ready access to the container 16 supported on the container support frame 22 or the frame insert 106 for replenishing the container 16 with grain or supplement, the distal side 42 of the container support frame 22 is provided with a pair of spatially disposed, outwardly extending lugs 128 and 130 adapted to matingly engage a header 134 of a ladder assembly 136 such that the header 134 and thus a ladder 138 of the ladder assembly 136 can be removably connected to the distal side 42 of the container support frame 22 substantially as shown in FIG. 1.

The header 134 is provided with a pair of spatially disposed substantially parallel side members 140 and 142 and a plurality of cross braces 144, 146 and 148 which function as rungs for the header 134 so as to enhance movement across the header 134.

The first and second side members 140 and 142 of the header 134 are provided with first end portions 150 and 152, respectively, adapted to matingly engage outwardly extending lugs 128 and 130 on the distal side 42 of the container support frame 22 substantially as shown. Similarly, the first and second side member 140 and 142 of the header 134 are provided with downwardly angled second end portions 154 and 156, respectively, adapted to matingly receive first end portions 158 and 160, respectively, and thereby provide a stable connection between the header 134 and the ladder 138. The interconnection of the ladder 138 to the header 134 and the header 134 to the distal side 42 of the container support frame 22, permits the stabilizing member 20 to be lifted and disposed adjacent a portion of the trunk 12 of the tree 14 whereby, upon securing the stabilizing member 20 to the trunk 12 of the tree 14 via the adjustable strap assembly 30, the container support frame 20 can be maintained in a substantially horizontal position a distance above ground level substantially as shown in FIGS. 1, 2 and 4. Once the stabilizing member 20 has been secured in a stable position on the trunk 12 of the tree 14 via the adjustable strap assembly 30, the container 16 can be carried up the ladder 138 and positioned on the container support frame 22. Once the container 16 has been disposed in a stable upright position on the container support frame 22, grain or supplement can then be carried up the ladder 138 and disposed in the container 16 for dispersement via the feed dispenser 18. It should be noted that the container 16 and feed dispenser 18 are commercially available conventional equipment and many are electrically timed to disperse grain or supplement at predetermined periods during the day and/or night. Since such containers and feed dispensers, as well as their battery-operated modes, are readily available and well-known in the art, no further comments concerning same are believed necessary.

Once the desired amount of grain or supplement has been dispersed in the container 16, the person descends the ladder 138, disconnects the header 134 from the lugs 128 and 130 on the distal side 42 of the container support frame 22 and lowers the ladder assembly 136 to the ground wherein the ladder 138 is disconnected from the header 134 for transportation of the ladder 138 and header 134 to an awaiting vehicle or to a remote location away from the feed container support device 10.

When it is desired to replenish the container 16 with grain or supplement, or to remove the container 16 from the container support frame 22 for subsequent removal of the feed container support device 10 from the trunk 12 of the tree 14, one merely connects the ladder 138 and the header 134 of the ladder assembly 136 and thereafter connects the header 134 to the lugs 128 and 130 of the container support frame 22. Thereafter, by ascending the ladder 138, the feed container 16 can be removed from the container support frame 22 and lowered to the ground. If one desires to remove the animal feeder support device 10 from the trunk 12 of the tree 14, the strap assembly 30 is disengaged whereby, upon descending the ladder 138 and lowering the animal feeder support device 10 to the ground, the ladder assembly 136 is disconnected from the container support frame 22 and disassembled so that the animal feeder support device 10 can be moved to a second location or to a waiting vehicle. If one desires to remove the container 16 from the container support frame 22 without removing the animal feeder support device 10 from the trunk 12 of the tree 14, one can remove the container 16 and then disconnect the ladder assembly 136 from the container support frame 22. Thereafter, upon lowering the ladder assembly 136 to the ground, the header 134 can be removed from the ladder 138 and the ladder 138 positioned against the trunk 12 of the tree 14 so that upon ascension of the ladder 138, one can position the container support frame 22 in the second stored position substantially as shown in FIG. 3.

While any suitable material capable of providing sufficient structural integrity to the animal feeder support device 10 can be used, desirable results have been obtained wherein the stabilizing member 20 is fabricated of 3"×3" angle iron, the hinge 54 used for pivotally connecting the container support frame 22 to the stabilizing member 20 is a 90° angle hinge, the container support frame 22, the arm 24 and the container frame insert 106 are fabricated of 1½" angle iron and the first and second cables 26 and 28 are 3/16" diameter cables. However, it should be understood that the construction of the animal feeder support device 10 is not limited to such materials.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. An animal feeder support device for maintaining a feed container on a substantially vertically extending support member a distance above the ground, the feed container having a feed dispenser positioned on a lower end thereof for dispersing feed from the container, the animal feeder support device comprising:

a stabilizing member disposable in a substantially vertical position on the substantially vertically extending support member;

a container support frame having a proximal side portion, a distal side portion, and an opening there between sized to receive the feed dispenser of the feed container such that the feed dispenser extends below the container support frame so as to permit feed to be disposed on the ground when the feed container is positioned on the container support frame, the proximal side portion of the container support frame connected to the stabilizing member so that the container support frame is selectively movable between a first position wherein the container support frame is disposed substantially adjacent the stabilizing member and a second position wherein the container support frame is disposed in a substantially horizontal position;

an arm having a first end, a medial portion and a second end, the medial portion of the arm connected to the stabilizing member such that the first and second ends of the arm are positioned on opposite sides of the stabilizing member and the arm is spatially disposed from the container support frame when the container support frame is in the second position;

a first cable having a first end and a second end such that the first end of the first cable is connected to the first end of the arm and the second end of the first cable is adjustably connected to the container support frame near the distal side portion thereof;

a second cable having a first end and a second end such that the first end of the second cable is connected to the second end of the arm and the second end of the second cable is adjustably connected to the container support frame near the distal side portion thereof such that the second cable is in a spatial relationship with respect to the first cable to permit the feed container to be positioned on the container support frame between the first and second cables; and an adjustable strap assembly having a first end and a second end such that the first and second ends of the strap assembly are connectable the arm near the medial portion of the arm so that the strap assembly is extendable about the vertically extending support member and cooperates with the stabilizing member, the arm, and the first and second cables to secure and maintain the container support frame in a substantially horizontal position when the feed container is disposed on the container support member for permitting unimpeded dispersement of feed from the feed container.

2. The animal feeder support device of claim 1 wherein the stabilizing member has a first leg and a second leg permitting the stabilizing member to be disposable in a substantially vertical position on the substantially vertically extending support member.

3. The animal feeder support device of claim 1 further comprising a frame insert disposable on the container support frame, the frame insert sized and dimensioned to receive a feed container having a diameter less than the size of the opening in the container support frame.

4. The animal feeder support device of claim 1 further comprising:

a plurality of spatially disposed tubular lugs extending outward from the distal side portion of the container support frame, the tubular lugs being adapted to support the weight of the animal feeder support device;

a header assembly comprising a lug end telescopically disposable within the tubular portions of the lugs to removably connect the header assembly to the lugs, and a ladder end having a pair of tubular leg portions, the header assembly being adapted to support the weight of the animal feeder support device; and a ladder assembly comprising a pair of supports having a header end and a base end, and a plurality of rungs disposed between the supports equally spaced from the header end to the base end, the header end of the supports having neck portions telescopically disposable within the tubular leg portions of the ladder end of the header assembly to removably connect the header assembly to the ladder assembly, the base end being adapted to be disposed adjacent the ground, the ladder assembly being adapted to support the weight of the header assembly and the animal feeder support device, thus enabling the use of the ladder assembly to mount the animal feeder support device and to permit access to the mounted animal feeder support device.

5. The animal feeder support device of claim 3, further comprising:

a plurality of spatially disposed tubular lugs extending outward from the distal side portion of the container support frame, the tubular lugs being adapted to support the weight of the animal feeder support device;

a header assembly comprising a lug end telescopically disposable within the tubular portions of the lugs to removably connect the header assembly to the lugs, and a ladder end having a pair of tubular leg portions, the header assembly being adapted to support the weight of the animal feeder support device; and a ladder assembly comprising a pair of supports having a header end and a base end, and a plurality of rungs disposed between the supports equally spaced from the header end to the base end, the header end of the supports having neck portions telescopically disposable within the tubular leg portions of the ladder end of the header assembly to removably connect the header assembly to the ladder assembly, the base end being adapted to be disposed adjacent the ground, the ladder assembly being adapted to support the weight of the header assembly and the animal feeder support device, thus enabling the use of the ladder assembly to mount the animal feeder support device and to permit access to the mounted animal feeder support device.

6. A method for securing an animal feeder support device for maintaining a feed container having a feed dispenser on a substantially vertically extending support member a distance above the ground, the method comprising:

connecting a plurality of spatially disposed tubular lugs extending outward from a distal side portion of a container support frame of the animal feeder support device to a lug end of a header assembly of the animal feeder support device, the lug end telescopically disposable within the tubular portions of the lugs;

connecting a pair of tubular leg portions of a ladder end of the header assembly of the animal feeder support device to a header end of a ladder assembly of the animal feeder support device, the header end of the ladder assembly of the animal feeder support device having neck portions telescopically disposable within the tubular leg portions of the ladder end of the header assembly of the animal feeder support device;

disposing a base end of the ladder assembly adjacent the ground;

raising the ladder assembly, header assembly, and container support frame adjacent to the substantially vertically extending support member;

stabilizing the ladder assembly, header assembly, and container support frame to the substantially vertically extending support member with a stabilizing member; and securing the stabilizing member in a substantially vertical position on the substantially vertically extending support member.

7. The method of claim 6, further comprising:

carrying the feed container up a ladder of the ladder assembly;

positioning the feed container on the container support frame to be supportingly held by the container support frame;

positioning the feed dispenser in a lower end of the feed container;

carrying feed up the ladder; and disposing feed in the feed container for disbursement via the feed dispenser.

8. The method of claim 7, further comprising:

disconnecting the plurality of spatially disposed tubular lugs extending from the distal side portion of the container support frame from the lug end of the header assembly;

lowering the ladder assembly to the ground; and disconnecting the tubular leg portions of the ladder end of the header, assembly from the header end of the ladder assembly.

9. The method of claim 8, further comprising:

transporting the header assembly and the ladder assembly to a remote location away from the animal feeder support device.

10. The method of claim 8, further comprising:

connecting the tubular leg portions of the ladder end of the header assembly to the header end of the ladder assembly;

raising the ladder assembly to the container support frame;

connecting the lug end of the header assembly to the plurality of spatially disposer tubular lugs extending from the distal side portion of the container support frame;

removing the feed container from the container support frame;

unsecuring the stabilizing member from the substantially vertically extending support member;

removing the stabilizing member from the substantially vertically extending support member;

lowering the animal feeder support device to the ground;

disconnecting the plurality of spatially disposed tubular legs extending from the distal side portion of the container support frame from the lug end of the header assembly;

disconnecting the tubular leg portions of the ladder end of the header assembly from the header end of the ladder assembly; and removing the animal feeder support device to another location.

* * * * *

UNITED STATES PATENT AND TRADEMARK OFFICE
CERTIFICATE OF CORRECTION

PATENT NO. : 6,684,812 B1
DATED : February 3, 2004
INVENTOR(S) : Eugene Tucker

It is certified that error appears in the above-identified patent and that said Letters Patent is hereby corrected as shown below:

<u>Column 9,</u>
Line 1, add the word -- to -- after "connectable" and before "the".

Signed and Sealed this

Twenty-fifth Day of May, 2004

JON W. DUDAS
*Acting Director of the United States Patent and Trademark Office*